United States Patent [19]

Newlands

[11] 4,120,512
[45] Oct. 17, 1978

[54] SADDLE PILLAR CLAMP FOR BICYCLE

[76] Inventor: Lawrence A. Newlands, 2371 SW. Cedar, Portland, Oreg. 97205

[21] Appl. No.: 759,389

[22] Filed: Jan. 14, 1977

[51] Int. Cl.² .............................................. B62K 19/36
[52] U.S. Cl. ................................. 280/281 R; 297/195
[58] Field of Search ............... 280/281 R, 287, 289 R; 403/110, 236; 297/195

[56] References Cited
U.S. PATENT DOCUMENTS

| 578,011 | 3/1897 | Girardet | 280/287 |
| 2,770,479 | 11/1956 | Hilber | 280/281 R X |

*Primary Examiner*—Joseph F. Peters, Jr.
*Assistant Examiner*—Michael Mar
*Attorney, Agent, or Firm*—Kolisch, Hartwell, Dickinson & Stuart

[57] ABSTRACT

A clamping assembly in a bicycle frame for clamping onto and mounting the pillar of a bicycle seat. The assembly includes a pair of spaced relatively movable clamping members mounted in concealed positions within the usual horizontal top frame tube in a bicycle frame adjacent where this tube joins with the usual seat tube. A screw adjustable device, such as a bolt, is recessed in one of the clamping members and is accessible through a bore in one side of the horizontal frame tube for actuating the members to clamp onto and release such a pillar.

6 Claims, 5 Drawing Figures

SADDLE PILLAR CLAMP FOR BICYCLE

BACKGROUND AND SUMMARY OF THE INVENTION

This invention pertains to bicycle construction, and more particularly, to a mechanism in the frame of a bicycle for clamping onto and thereby mounting the pillar of a bicycle seat.

A typical means for mounting the pillar of a bicycle seat in a bicycle frame includes a split or slotted collar or lug which fits around the upper end of the usual seat tube in the frame, with this tube also including a slot which is generally aligned with that provided in the collar. Opposed, outwardly bent projecting ears are provided on the collar on opposite sides of the slot therein, through which a nut and bolt assembly, or the like, may be inserted and actuated for drawing the collar, and hence, the upper end of the seat tube, tightly against such a pillar.

Several problems exist with this construction. To begin with, slotting of the seat tube weakens it. Secondly, where the ears bend there exist regions of high stress with usually little supporting mass to prevent fatiguing with repeated mountings and demountings of a seat.

A general object of the present invention is to provide an improved form of clamping mechanism which simplifies a mounting and demounting operation for a seat, affords more reliable clamping, and which also promotes a superior overall construction for a bicycle frame.

Still another object of the invention is to provide such a mechanism wherein, unlike the outwardly projecting lugs in a conventional clamping mechanism, clamping members are concealed within the inside of the frame, thus to enhance significantly the appearance of the frame in the region where the seat is mounted.

According to a preferred embodiment of the invention, the proposed clamping mechanism includes a pair of spaced relatively movable clamping parts which are disposed within the rear end of the usual top frame tube in a bicycle frame, with these two members having concave, cylindrical clamping surfaces which face, through an opening, into the interior of the upper end of the usual seat tube in the frame. One of the clamping members is preferably secured to the top tube, and the other is movable therewithin. A bolt, such as an Allen-head-type bolt, extends between the clamping members, with the head of this bolt suitably recessed within an outwardly facing socket provided in the fixed clamping member and exposed through a single, suitable side opening in the top tube. This bolt may be adjusted to draw the clamping members relatively toward each other, or to shift them away from each other, to clamp onto and release the pillar of a seat inserted in the upper end of the seat tube.

The proposed clamping mechanism is therefore an extremely simple construction which functions highly effectively to clamp into the seat pillar. Further, the proposed mechanism promotes a superior overall frame construction inasmuch as slotting and weakening of the upper end of the seat tube is not necessary. In addition, the proposed construction affords an extremely streamlined appearance to that region of a bicycle where the seat is mounted.

These and other objects and advantages which are attained by the invention will become more fully apparent as the description which follows is read in conjunction with the accompanying drawings.

DESCRIPTION OF THE INVENTION

Figure 1:
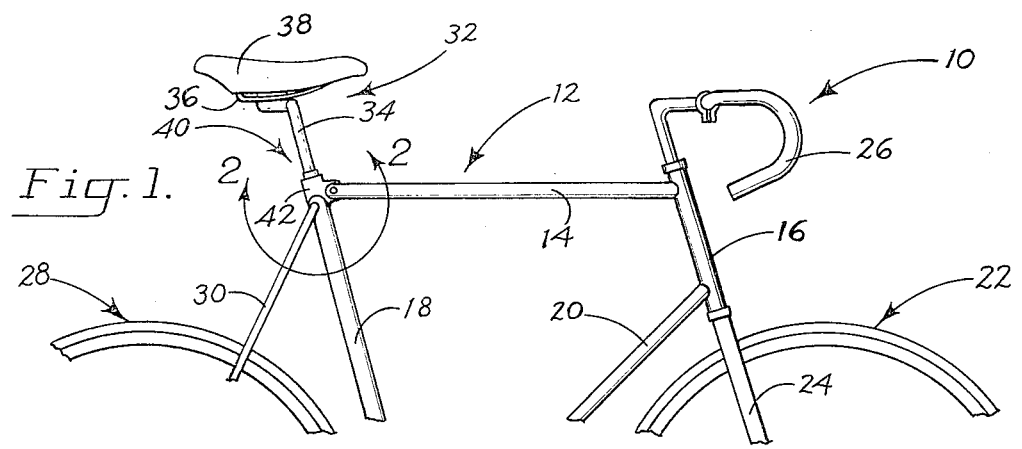
FIG. 1 is a simplified side elevation of the upper portion of a bicycle incorporating a seat-clamping mechanism constructed in accordance with the present invention.

Turning now to the drawings, and referring first to FIG. 1, indicated generally at 10 is the upper portion of a bicycle incorporating a seat-clamping mechanism which is constructed in accordance with the present invention. Included in bicycle 10 is a frame 12 having a substantially horizontal hollow, cylindrical top tube 14, an upwardly and rearwardly inclined head tube 16, an upwardly and rearwardly inclined seat tube 18, and an upwardly and forwardly inclined bottom tube 20. Except as will be specifically pointed out later herein, frame 12, and all of the tubes therein, are of conventional construction, and are joined to each other in a conventional manner and arrangement.

At the front of the bicycle is a front wheel 22 carried by fork 24 that is journaled in head tube 16, and turned to steer the bicycle by means of the usual handlebar 26. At 28 is the rear wheel of bicycle 10, mounted in the usual fashion. And, shown at 30 is one of the two conventional seat stays provided in a bicycle.

Shown generally at 32 in FIG. 1 is a conventional bicycle seat including the usual elongated cylindrical pillar 34 which, through a frame 36 fastened adjacent the top of the pillar, supports the usual saddle 38. The outside diameter of pillar 34 is slightly less than the inside diameter of hollow seat tube 18, and is inserted downwardly therein so as to extend a distance of several inches into the seat tube to provide for vertical adjustment of the seat position.

Finally, and shown generally at 40, or perhaps more precisely in the region indicated at 40, and functioning to clamp pillar 34 in place within tube 18 is the novel clamping mechanism which is proposed by the present invention.

Details of construction of mechanism 40 are illustrated in FIGS. 2-5, and accordingly, attention is directed to these additional figures along with FIG. 1.

Figure 2:
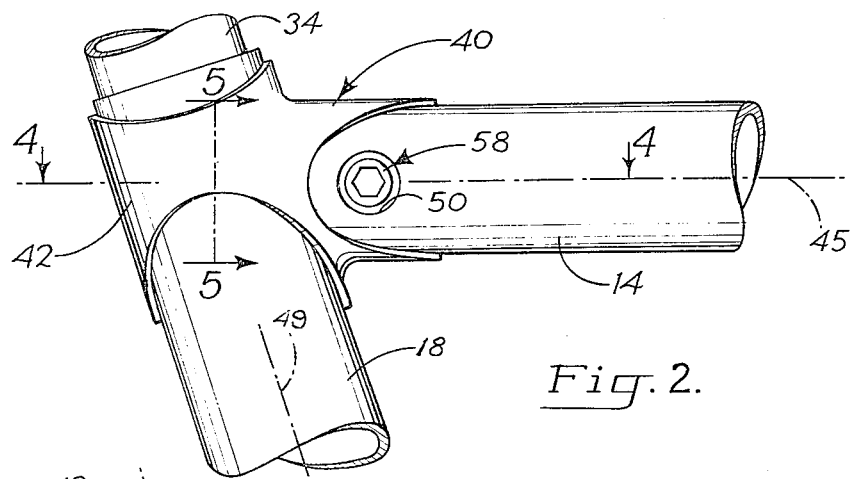
FIG. 2 is an enlarged fragmentary detail generally illustrating that area of a bicycle in FIG. 1 encompassed by the curved double-ended arrow marked 2—2.

As can be seen in FIG. 2, top tube 14 joins seat tube 18 through a receiving lug or fitting 42, shaped as generally shown, and welded to the tubes. Formed in the side wall of tube 18 where this tube joins with tube 14, is a circular opening 44 which is somewhat smaller in diameter than the inside diameter of tube 14. Opening 44 has been drilled or otherwise prepared along the longitudinal axis 45 of tube 14. By virtue of the existence and location of opening 44, the inside of tube 18 is exposed to the inside of the left end of tube 14 in the figures.

Figures 3, 5:
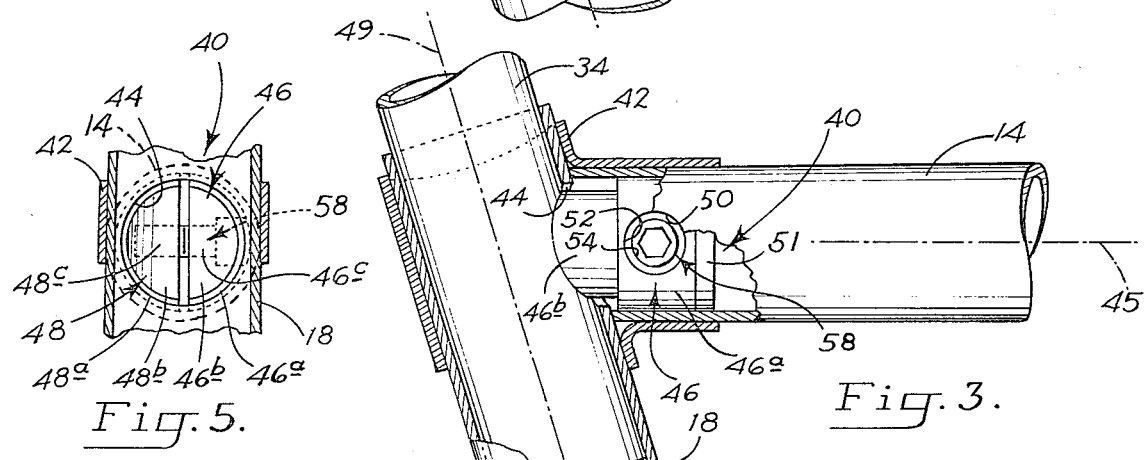
FIG. 3 is similar to FIG. 2, except that it has portions broken away to illustrate details of construction.
FIGS. 4 and 5 are fragmentary cross sections taken along the lines 4—4 and 5—5, respectively, in FIG. 2.
Figure 4:
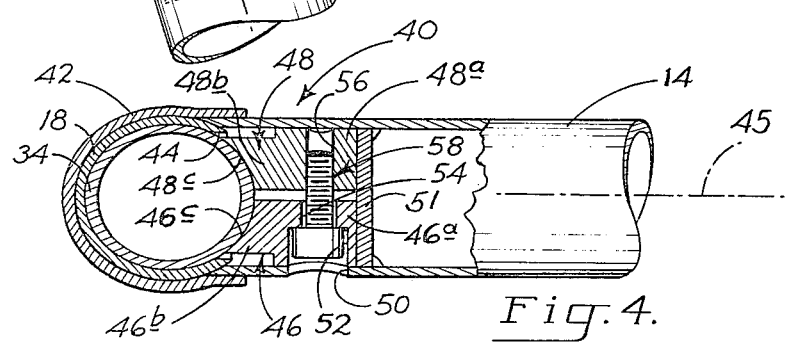

Previously mentioned clamping mechanism 40 includes a pair of spaced opposed, generally semicircular (as viewed along axis 45), relatively movable clamping members 46, 48. Clamping member 46, adjacent its right end in FIGS. 3 and 4 is joined to a circular plate 51 which spans and is brazed to the inside of tube 14. The outside diameter of member 46, in a right-end portion is 46a, substantially the same outside diameter as the inside diameter of tube 14. Joined to portion 46a is a reduced "outside diameter" portion 46b. Formed on the left side of portion 46b is a concavely curved face 46c, referred to herein as a clamping face. The diameter of the curvature of face 46c is substantially the same as that of the inside diameter of tube 18, and is formed at an angle whereby the axis of its curvature is parallel to the longitudinal axis 49 of tube 18, with the parts in place. In particular, clamping member 46 is positioned within tube 14 at such a location whereby face 46c is substantially coextensive with the curvature of the inside wall of tube 18.

Provided in the side wall of tube 14 which faces the viewer in FIG. 3, and is disposed toward the bottom of FIG. 4, is a circular opening 50. This opening exposes a cylindrical recess 52, of the same diameter, formed in portion 46a, which recess joins axially with a smaller-diameter bore 54.

Clamping member 48 includes a right-end portion 48a substantially the same in configuration as end portion 46a in member 46. Portion 48a joins with a reduced "outside diameter" portion 48b which is substantially like previously described portion 46b. Formed on the left side of portion 48b is a concavely cylindrically curved face 48c which corresponds to previously mentioned face 48c.

Formed in portion 48a in clamping member 48 is a threaded bore 56 (see FIG. 4) which is axially aligned with previously mentioned bore 54 and recess 52. An Allenhead-type conventional bolt 58 which includes the usual head contained within recess 52, and a threaded shank that clears bore 54, and is screwed into bore 56.

From the description which has just been given, it is believed now fairly obvious how clamping mechanism 40 functions. Member 46 is rigidly in place within tube 14. Member 48 is movable toward and away from member 46 through turning of bolt 58 which, of course, is accessible from the outside of tube 14, but which, it will be noted, is recessed within the outside surface of this tube. With seat pillar 34 inserted as shown downwardly within tube 18, bolt 58 is adjusted to draw member 48 toward member 46, thereby to press clamping faces 46c, 48c against the outside surface of the pillar. This action securely clamps the pillar in place in tube 18.

It will be obvious, now, how the clamping mechanism of the invention provides for a far superior clamping function than that are attainable by a conventional, split-tube projecting-lugtype seat clamps. Further, it will be observed, that there are no high-stress areas in mechanism 40 which suffer from the deficiencies of the bends mentioned earlier in the clamping lugs provided in conventional bicycle seat clamps.

Yet another outstanding feature of the invention is that it avoids the necessity for slotting, and thereby weakening, of tube 18. Also, because of the fact that the mechanism is contained completely within frame 14, 18, it is in a protected location, and through simplifying the outside appearance of a bicycle, enhances its appearance significantly.

While a preferred embodiment of the invention has been described herein, it should be apparent to those skilled in the art that variations and modifications are possible without departing from the spirit of the invention.

What is claimed is:

1. Means in a bicycle frame for mounting the pillar of a bicycle seat, where the frame includes a first elongated, cylindrical, hollow, generally horizontal frame member, and a second elongated, cylindrical, hollow, generally upright frame member, with said first frame member having one end joined adjacent the upper end of said second frame member, and with said second frame member including an open top defined by a continuous generally circular wall expanse adapted freely to receive such a pillar within the member with the pillar extending downwardly past the region of joinder of said two frame members, said mounting means comprising means defining an opening in said second frame member exposing to the interior thereof the interior of said first frame member, a first concealed clamping member disposed within said first frame member adjacent said opening and including a clamping face exposed to the interior of said second frame member and clampingly engageable with a seat pillar received within said second frame member, a second concealed clamping member disposed within said first frame member adjacent, and movable relatively toward and away from, said first clamping member, said second clamping member also having a clamping face exposed to the interior of said second frame member clampingly engageable with a seat pillar received within said second frame member in cooperation with said clamping face on said first clamping member, and actuating means operatively connected to said clamping members, accessible and operable from outside said frame for shifting said members relatively toward and away from each other without effecting any configuration change in said upper end of said second frame member.

2. The mounting means of claim 1, wherein the inside of said second frame member is defined by a substantially cylindrical wall expanse, and said clamping faces are each defined by a substantially cylindrical concave surface of revolution having a radius of substantially the same as that of said wall expanse.

3. The mounting means of claim 1, wherein said actuating means comprises a recessed screw-adjustable device which is accessible from one side of said first frame member.

4. Means in a bicycle frame for mounting a bicycle seat thereon, where the seat includes an elongated mounting pillar, and the frame includes elongated, joined, angularly intersecting top and seat tube members, with the latter adapted to receive such a pillar with the pillar extending past the region of joiner of said tube members, said mounting means comprising a concealed bind-producing mechanism including a pair of opposed relatively movable members disposed within said top tube member, one of said members having a fixed position within said top tube member and the other being relatively movable therein, said relatively movable member being actuatable, with a seat pillar received by said seat tube member and extending past said region of joinder, to produce a bind between the pillar and the seat tube member, and actuating means within said frame operatively connected to said members in said bind-producing mechanism, accessible from outside said frame for actuating the bind-producing mechanism, actuation of said bind-producing mechanism to produce a bind between a pillar and the seat tube member effecting no configuration changes in said tube member.

5. The mounting means of claim 4, wherein said actuating means comprises an adjustable device recessed within said top tube member and actuatable from one side thereof.

6. Means in a bicycle frame for mounting the pillar of a bicycle seat, where the frame includes a first elongated, cylindrical, hollow, generally horizontal frame member, and a second elongated, cylindrical, hollow, generally upright frame member the inside of which is defined by a substantially cylindrical wall expanse, said first frame member having one end joined adjacent the upper end of said second frame member, and said second frame member including an open top adapted freely to receive such a pillar within the member with the pillar extending downwardly past the region of joinder of said two frame members, said mounting means comprising means defining an opening in said second frame member exposing to the interior thereof the interior of said first frame member, a first concealed clamping member disposed within said first frame member adjacent said opening and including a clamping face exposed to the interior of said second frame member and clampingly engageable with a seat pillar received within said second frame member, said clamping face being defined by a substantially cylindrical concave surface of revolution having a radius which is substantially the same as that of said wall expanse, a second concealed clamping member disposed within said first frame member adjacent, and movable relatively toward and away from, said first clamping member, said second clamping member also having a clamping face like said first-mentioned clamping face exposed to the interior of said second frame member clampingly engageable with a seat pillar received within said second frame member in cooperation with said clamping face on said first clamping member, and actuating means operatively connected to said clamping members, accessible and operable from outside said frame for shifting said members relatively toward and away from each other.

* * * * *